United States Patent Office 3,093,117
Patented June 11, 1963

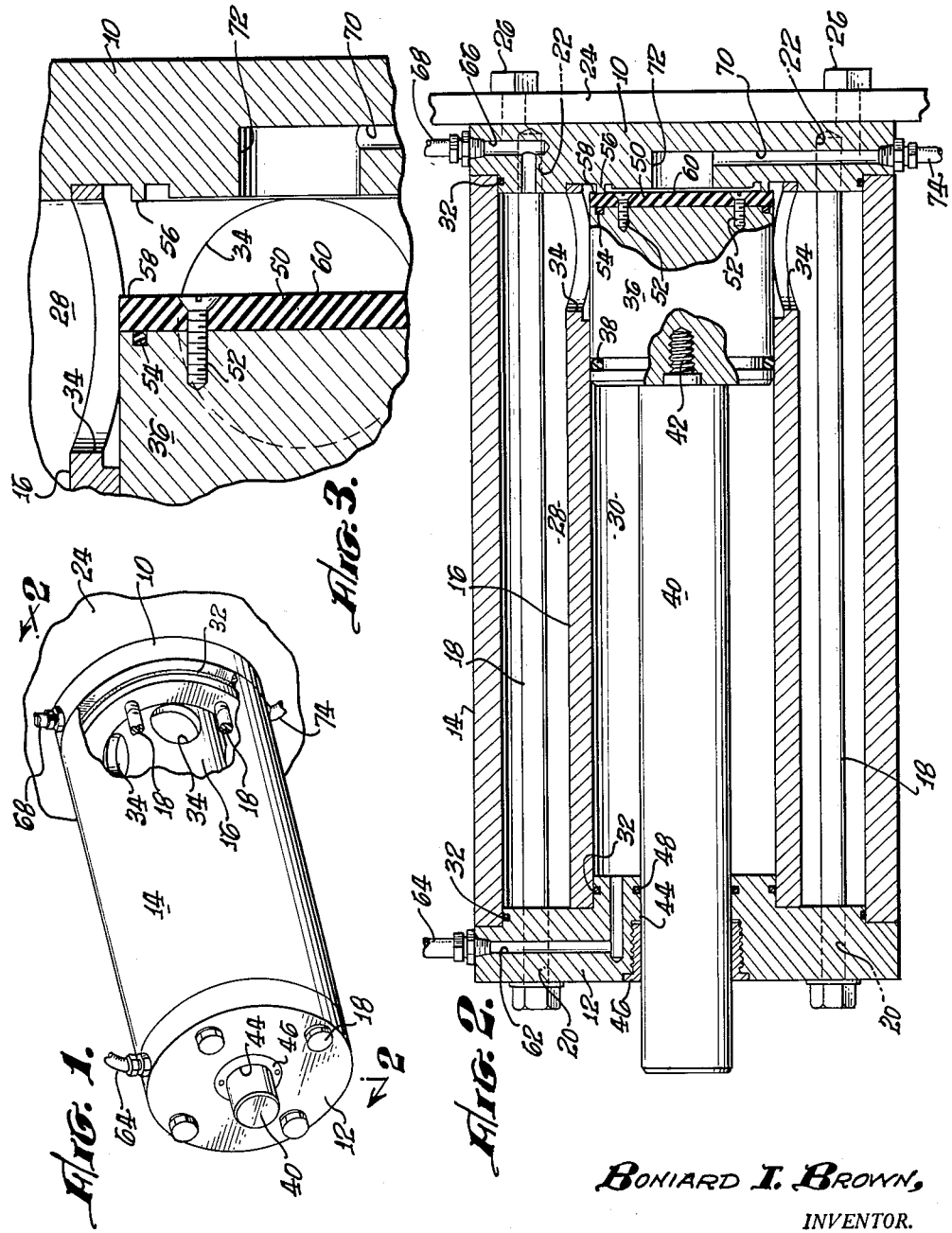

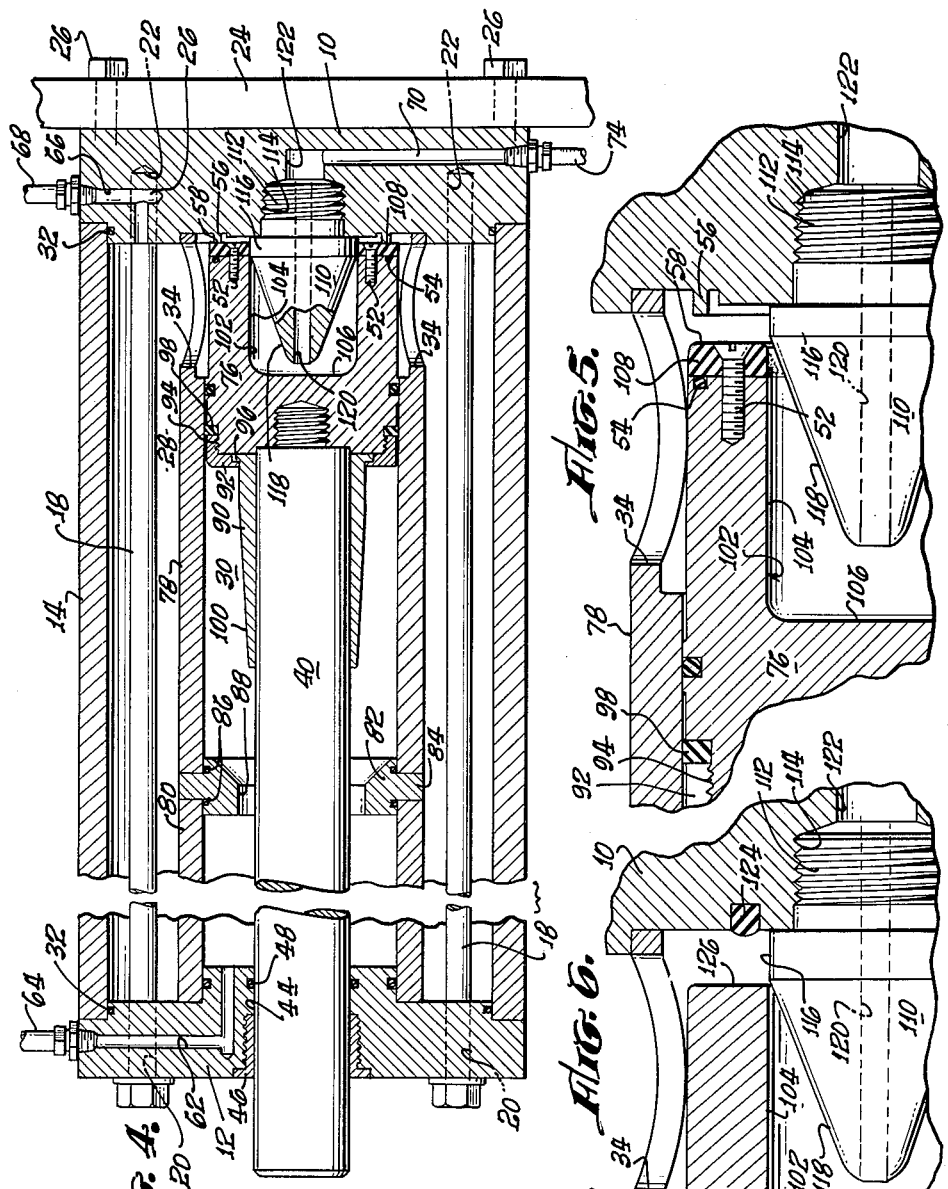

3,093,117
HIGH ENERGY RATE ACTUATOR

Boniard I. Brown, West Covina, Calif., assignor to General Dynamics Corporation, San Diego, Calif., a corporation of Delaware
Filed June 27, 1960, Ser. No. 38,844
18 Claims. (Cl. 121—38)

The present invention relates generally to actuators; more particularly, it relates to high energy rate actuator systems for producing controlled output thrust.

The present invention is related to the inventions described and claimed in the copending application of Jack Benton Ottestad, Serial No. 617,014, filed October 19, 1956, now U.S. Patent No. 2,979,938, the copending application of Jack B. Ottestad and Samuel A. Skeen, Serial No. 683,855, filed September 13, 1957, now U.S. Patent No. 2,949,096, and the copending application of Jack Benton Ottestad and Samuel Arthur Skeen, Serial No. 690,774, filed October 17, 1957, now U.S. Patent No. 2,997,025. In each of the devices of the copending applications, a set force urges an actuator piston toward an orifice wall to effect a positive pressure seal between a piston and a wall about the orifice by means of a sealing element. An actuating pressure acts through the orifice on an area of the actuator piston within the pressure seal to oppose the set force. The actuating pressure is very rapidly released through the orifice by impelling the release piston from the orifice wall, either by increasing the actuating pressure on the piston area within the seal to overbalance the set force, or by utilizing a separate triggering force to cooperate with the actuating pressure in overbalancing the set force. The overbalancing unseats the release piston from the orifice wall, thereby eliminating the pressure seal and releasing the actuating pressure upon the actuator piston area outside the seal. The actuator piston is thus rapidly accelerated from the wall to produce useful output.

The devices of the copending applications are characterized by certain disadvantages. Pressure chambers on both sides of an orifice wall involve relatively complex structures which are too elongated for many applications. The very rapid release of actuating pressure through the orifice during piston acceleration produces orifice losses which substantially reduce output thrust and operating efficiency. Useful output thrust is also reduced and efficiency is affected by failure to maintain sufficient actuating pressure against the actuator piston during its output stroke, because the pressurized gas does not have sufficiently rapid access to the rapidly moving piston. The pressurized gas cannot pass through the orifice and pressurize the suddenly expanding volume behind the rapidly moving piston with sufficient rapidity. Where the actuating pressure chamber is of the same cross-sectional area as the set pressure chamber, as is generally the case where pressure chambers are provided on both sides of an orifice wall, the expansion of the relatively small actuating pressure supply further reduces the pressure applied to the moving actuator piston.

The actuator of the present invention comprises an actuator piston confronting a wall which has no orifice. The actuator piston and the wall are adapted for cooperation to provide a pressure seal therebetween about a portion of the wall. The piston is urged by a set force into engagement with the wall to establish the pressure seal. An actuating pressure is established to act on an area of the actuator piston outside the pressure seal to exert a second force opposing the set force. The set force is then overbalanced either by increasing the actuating pressure on the piston area outside the pressure seal, or by utilizing a separate triggering force to cooperate with the second force on the piston area outside the pressure seal in overbalancing the set force. The overbalancing unseats the actuator piston from the wall and suddenly eliminates the pressure seal to release the actuating pressure upon the piston area within the pressure seal, thereby rapidly accelerating the piston. The triggering force may be provided by a triggering pressure applied to the actuator piston area within the pressure seal. The triggering pressure may be the same as the actuating pressure. An output thrust-time or acceleration-time pattern may be governed by utilizing a metering member mounted on the wall and adapted to extend into a cavity or opening in the piston. The metering member cooperates with the piston during its movement to regulate the release of pressure against the piston. Predetermined piston deceleration may effected by utilizing a deceleration metering pin on the piston and a cooperating aperture. A coaxial construction may preferably be utilized wherein an actuator pressure chamber is disposed coaxially outside an inner chamber in which the actuator piston is slidable. A relatively large actuating pressure chamber may thus be conveniently provided, and ports between the chambers may provide good communication between the chambers when the piston is moving.

Actuators according to the invention may be of relatively simplified construction. Because pressure chambers need not be on opposite sides of a wall, the aforementioned coaxial construction may be utilized. The necessary length of an actuator is governed only by the length of the required output stroke. The actuator is adapted to provide improved output thrust and efficiency. There are no orifice losses, because pressurized gas is not required to pass through an orifice to be effective against the rapidly moving piston in the production of output thrust. Improved output thrust and efficiency also result from rapid access of the actuating pressure to the rapidly moving actuator piston. Pressure is released and maintained against the piston without substantial restriction. The maintenance of the actuating pressure against the moving piston may be further facilitated by the relatively large supply or actuating pressure chamber which may conveniently be provided because of the aforementioned coaxial construction wherein the actuating pressure chamber is outside the inner chamber containing the piston.

It is therefore an object of the present invention to alleviate the aforementioned and other disadvantages of the prior art by providing a novel and improved actuator for producing high energy rate output thrust.

An object of the invention is the provision of an improved actuator which generally achieves the objects of the prior inventions hereinbefore mentioned.

It is an object of the invention to provide a novel actuator wherein pressure is rapidly released upon and efficiently maintained against an actuator piston during its output stroke.

An object of this invention is to provide improved actuator output by providing improved access of actuating pressure to an actuator piston during rapid piston movement.

It is an object of the present invention to provide a high energy rate actuator utilizing an advantageous coaxial construction for high efficiency.

An object of this invention is the provision of an actuator wherein a thrust-time output pattern is governed by the cooperation of an actuator piston with a contoured metering member on a wall.

It is an object of the invention to provide a novel actuator wherein the rapid unseating of an actuator piston from a wall effects a sudden application of actuating pressure to a piston area.

An object of the present invention is to provide an actuator system wherein a set force urges an actuator piston toward a wall to effect a pressure seal therebetween about a portion of the piston, and wherein an actuating pressure exerts an opposing force on a piston area outside the pressure seal, thereby preparing the actuator to be operated by the application of a force to the piston to overbalance the set force and suddenly release the actuating pressure on the piston area within the pressure seal.

Another object of the invention is the provision of an actuator according to the foregoing object wherein the overbalancing force is that of a triggering pressure applied to an area of the actuator piston.

Another object of the invention is to provide an actuator which is adapted to be as short as the length of the output stroke permits.

Other objects, features and advantages of the present invention will become apparent to those versed in the art from a consideration of the following description, the appended claims and the accompanying drawings, wherein:

FIGURE 1 is a perspective view of a preferred embodiment of the actuator of the present invention;

FIGURE 2 is an enlarged elevational sectional view taken at line 2—2 of FIGURE 1;

FIGURE 3 is an enlarged fragmentary sectional view showing details of certain elements of the actuator of FIGURE 2;

FIGURE 4 is an elevational sectional view of a modified actuator according to the present invention;

FIGURE 5 is an enlarged fragmentary sectional view showing details of certain elements of the actuator of FIGURE 4; and FIGURE 6 is a fragmentary sectional view wherein a modified form of the actuator of FIGURE 4 is shown during operation.

Referring to the drawings, and particularly to FIGURES 1, 2 and 3, there is shown a preferred embodiment of the actuator of the present invention. The device includes a housing assembly formed by a wall member 10, an end member 12, an outer casing 14 and an inner cylinder 16, all of which are secured in clamped relation by tie-bolts 18. Each of the tie-bolts extends through an appropriate opening 20 in the end member 12 and is secured in a threaded opening 22 in the wall member 10. The assembly is secured to a mounting plate 24 by bolts 26 which extend through openings in the plate into threaded engagement with the wall member, as shown. The housing is separated into an outer actuating pressure chamber 28 and an inner coaxial set pressure chamber 30 by the inner cylinder 16. Pressure sealing is provided for the pressure chambers 28, 30 by resilient seal rings 32 disposed in appropriate grooves in the end member 12 and in wall member 10, the seal rings being in sealing engagement with the casing 14 and the cylinder 16, as shown. Four large circular ports 34 are provided in the cylinder 16 adjacent to the wall member 10 for a purpose hereinafter described.

An actuator piston 36 is slidable in the inner cylinder 16 and confronts the wall member 10. The piston is adapted to seat against the wall, as shown in FIGURE 2. An annular seal ring 38 in a peripheral groove in the piston provides pressure sealing between the cylinder 16 and the piston. A thrust column 40 is secured to the actuator piston by threaded engagement of its reduced end portion 42 in an opening in the piston. The thrust column extends through an axial opening 44 in end member 12 and is slidably received in a bearing 46 threadedly secured within an enlarged portion of the opening 44. A resilient ring 48 in an appropriate groove within the opening provides pressure sealing about the thrust column.

A circular resilient sealing element or sealing plate 50, preferably formed of Teflon or nylon, is secured by screws 52 to the piston in confronting relation with the wall member 10. An annular seal ring 54 provides pressure sealing between the sealing element and the piston. As shown in FIGURES 2 and 3, a circular sealing rim 56 is defined in the wall member 10. The sealing element 50 and the sealing rim 56 are adapted to effect a circular pressure seal between the piston and the wall member about a portion of the wall member, when the piston is urged into engagement with the rim 56. As indicated in FIGURE 2, an annular area 58 of the piston or of the sealing element 50 is disposed outside this circular pressure seal, and a circular piston area 60 is defined within the pressure seal.

A passage 62 in end member 12 and a fluid coupling 64 connect the set pressure chamber 30 with a source of set pressure (not shown). A passage 66 in the wall member 10 and a fluid coupling 68 interconnect the actuating pressure chamber 28 and a source of actuating pressure (not shown). A radial passage 70, an axial opening 72 in the wall member and a fluid coupling 74 communicate the piston area within the pressure seal confronting the wall member with a source of triggering pressure (not shown).

To prepare the actuator of FIGURE 2 for operation, a set pressure is introduced into the set pressure chamber 30 through the coupling 64 and the passage 62. The set pressure acts upon the effective cross-sectional area of the actuator piston 36 defined within the seal ring 38. A set force is thereby exerted which urges the piston against the wall member 10 and compresses the resilient sealing element 50 against the sealing rim 56 to effect a positive pressure seal about a portion of the wall member 10. A relatively high actuating pressure is established in the actuating pressure chamber 28 through the coupling 68 and the passage 66 in wall member 10. The actuating pressure in chamber 28 acts through the ports 34 on the annular piston area 58 radially outside the pressure seal. The force of this pressure on the annular area 58 opposes the set force on the piston and may be predetermined to substantially balance the set force and hold the piston in equilibrium. The resilient sealing element 50 effects a positive pressure seal even while the forces on the piston are nearly balanced.

To operate the actuator, the set force is overbalanced. This may be done by increasing the actuating pressure in chamber 28 to exert on the piston area outside the pressure seal an additional force which may be considered a triggering force. The overbalancing may preferably be done by utilizing a separate triggering force to cooperate with the actuating pressure force on the piston area outside the pressure seal in overbalancing the set force. This triggering force may be applied mechanically to the thrust column. It is preferably applied by introducing a triggering pressure through the passage 70 and the opening 72 to the actuator piston area within the pressure seal at the sealing rim 56. This triggering pressure is predetermined to overbalance the set force by cooperating with the force of the actuating pressure on the piston area 58 outside the pressure seal. The overbalancing action unseats the actuator piston and the sealing element 50 is disengaged from the sealing rim 56. With the pressure seal thus eliminated, the high actuating pressure is released substantially instantaneously upon the area of the actuator piston within the pressure seal and confronting the wall member 10. The actuator piston is suddenly impelled with great force from the wall to produce high level actuator output, as indicated in FIGURE 3.

From the foregoing and from the earlier description herein, it will be understood that the actuating pressure has substantially unrestricted and rapid access to the rapidly moving piston. The pressure passes freely through the ports 34, which provide free access. Actuating pressure is therefore effectively maintained against the rapidly moving piston, and high efficiency is achieved.

Deceleration of the actuator piston is effected by compression in the set pressure chamber 30 by the actuator piston, as well as by the external load on the thrust column. Special structure is not necessarily required to effect actuator piston deceleration.

To prepare the actuator for repeat operation, the actuator piston 36 is reseated against the wall member 10. Reseating may be effected by mechanical force on the thrust column 40. A preferable method of reseating is by reducing the pressure in the actuating pressure chamber 28 below the pressure in chamber 30, thereby permitting the latter pressure to move the piston against the wall member. Reseating may also be effected by the introduction into the set pressure chamber 30 through the coupling 64 and the passage 62 of a seating pressure higher than the actuating pressure. After reseating, the seating pressure in chamber 30 would be relieved to re-establish the set pressure.

Upon the reseating of the actuator piston the trapping of pressure in the space defined by the wall member 10, the actuator piston 36, and the pressure seal at sealing rim 56 is prevented by relieving pressure through the opening 72 and the passage 70 in the wall member 10. Pressure trapped in this space would act upon the actuator piston to oppose the set force exerted oppositely on the piston. A relatively low pressure in the actuating pressure chamber 28 would then effect movement of the piston from the wall member. This would prevent effective triggering and would cause premature relatively slow movement of the actuator piston, thus preventing effective operation of the actuator.

In FIGURES 4 and 5 there is illustrated another embodiment of the present invention. This modified actuator differs from that of FIGURES 1, 2 and 3 in that it embodies a metering member arrangement and means for decelerating the piston. A piston 76 is slidable in a cylindrical section 78, as shown. Cylindrical section 78 and a cylindrical section 80 together constitute an inner cylinder. An apertured plate member 82 has its flange portion 84 interposed between adjacent ends of cylindrical sections 78 and 80, as shown, these parts being secured in clamped relation by the tie-bolts 18. Resilient annular seals 86 in appropriate annular grooves in the plate member on each side of the flange portion 84 provide pressure sealing between the plate member and the cylindrical sections. An aperture 88 is defined in the plate member.

A deceleration metering pin 90 fits about the thrust column 40 and is secured to the piston 76 by means of a lock ring 92 which is threadedly secured to a reduced end portion 94 of the piston to secure the deceleration pin by means of mutually engaging flange portions, as indicated at 96. A bearing ring 98 is also secured by the lock ring. The deceleration pin has a peripheral surface 100 which is contoured along its length to adapt it to cooperate with the aperture 88 for a purpose which is hereinafter described.

A large axial opening or cavity 102 is defined in the piston and confronts the wall member 10. The cavity or opening is defined by an inner piston surface 104 and a transverse end wall 106. An annular sealing plate 108 is mounted on the end surface of the piston, as shown, and is similar to the sealing element 50 of FIGURES 2 and 3.

A metering member 110 is secured to the wall member 10 within the seal rim 56 by threaded engagement of its shank portion 112 in an axial opening 114 in the wall member. The metering member has an enlarged cylindrical portion 116, adapted to fit closely within the piston cavity 102, and a contoured portion 118, which serves a purpose hereinafter described.

An axial passage 120 in the metering member 110, an axial opening 122 in the wall member, the radial passage 70 in the wall member and the fluid coupling 74 connect the piston cavity 102 with a source of triggering pressure (not shown). The triggering pressure may preferably be the same as the actuating pressure.

FIGURE 6 illustrates a somewhat modified form of the actuator of FIGURE 4, wherein modified sealing means are utilized for effecting the pressure seal between the actuator piston and the wall member 10. A resilient annular sealing element 124 is secured as by bonding in an annular groove in the wall member, and is disposed about the metering pin 110, as shown. The sealing element 124 is adapted for cooperation with the end surface 126 of the actuator piston to provide pressure sealing. Compression of the resilient element 124 against the end surface of the piston by the set force effects the pressure seal. The operation of the device of FIGURE 6 is otherwise the same as that of the actuator shown in FIGURE 4.

The metering member 110 is contoured to control the output thrust-time pattern of the actuator. The operation of the actuator is identical to that of the actuator of FIGURE 2 except that, upon the elimination of the pressure seal at the sealing rim 56 by the initial unseating movement of the actuator piston, the actuating pressure is released upon the piston through a net flow area between the metering member and the surface 104 of piston cavity 102 as indicated in FIGURE 5. This net flow area is governed by the metering member and a pressure drop is effected across this flow area which varies according to the net effective flow area. The output pressure and force on the actuator piston and on the thrust column therefore vary in accordance with the net flow area. Selected thrust-time patterns may be produced by appropriate metering pins. The manner of determining appropriate metering pin contours for selected output patterns is described in the above-mentioned copending application of Jack B. Ottestad, Serial No. 683,855, filed September 13, 1957, now U.S. Patent No. 2,949,096.

After the acceleration phase of the predetermined thrust-time output pattern is completed, the deceleration metering pin 90 cooperates with the apertured plate member 82 to effect a predetermined deceleration pattern. Piston movement forces gas or fluid through the aperture 88, and the contoured surface 100 of the pin controls flow through the aperture by regulating the net aperture flow area. This net area varies in accordance with the longitudinal contour of the deceleration pin, and a desired deceleration-time pattern is obtained by appropriate contouring.

From the foregoing description those versed in the art will appreciate that the present invention achieves the objects and realizes the advantages hereinbefore mentioned.

Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation within the terms of the appended claims.

The inventor claims:

1. An actuator comprising means defining a wall having a pressure retaining portion, an actuator piston adapted for cooperation with the wall to provide a pressure seal therebetween about said portion of the wall, means for exerting a set force urging the piston toward the wall to effect said pressure seal, and means for applying pressure to the piston to overbalance the set force to eliminate said pressure seal and apply the pressure to an increased area of the piston, whereby the actuator piston is impelled from the wall to produce output thrust.

2. An actuator comprising means defining a wall having a pressure retaining portion, an actuator piston confronting the wall and adapted for cooperation therewith to provide a pressure seal therebetween about said portion of the wall, means for exerting a set force urging the actuator piston toward the wall to effect said pressure seal, said pressure seal separating first and second areas of the piston, means for applying an actuating pressure to said first piston area to exert a second force opposing said set force, and means for applying a triggering force to the piston to cooperate with the said second force in overbalancing the set force to eliminate the pressure seal and apply the actuating pressure to said second piston area, whereby the piston is rapidly moved from the wall to product output thrust.

3. An actuator comprising means defining a wall, an actuator piston confronting the wall and adapted for cooperation therewith to provide a pressure seal therebetween about a portion of the wall, means for exerting a set force urging the actuator piston toward the wall to effect said pressure seal, said pressure seal separating first and second areas of the piston, means for applying an actuating pressure to said first piston area to exert a second force opposing said set force, means for applying a triggering force to the piston to cooperate with the said second force in overbalancing the set force to eliminate the pressure seal and apply the actuating pressure to said second piston area, said actuator piston having a cavity defined by an inner piston surface and confronting the wall, and a contoured metering member extending from the wall and cooperating with said inner piston surface to regulate flow to the moving piston to produce a predetermined thrust-time output pattern.

4. An actuator comprising means defining a wall having a pressure retaining portion, an actuator piston confronting the wall, a resilient sealing element positioned between the piston and the wall for effecting a pressure seal therebetween about said portion of the wall, means for exerting a set force urging the piston toward the wall to effect said pressure seal, and means for applying pressure to the piston to overbalance the set force to eliminate said pressure seal and apply the pressure to an increased area of the actuator piston, whereby the piston is rapidly impelled from the wall to produce output thrust.

5. An actuator comprising means defining a wall having a pressure retaining portion, an actuator piston confronting the wall, sealing means disposed between the piston and the wall for effecting a pressure seal therebetween about said portion of the wall, means for exerting a set force urging the actuator piston toward the wall to effect said pressure seal, said pressure seal separating a first piston area outside the pressure seal and a second piston area within the pressure seal, and means for establishing an actuating pressure to act upon said piston area outside the pressure seal to overbalance said set force to eliminate the pressure seal and release the actuating pressure upon said first piston area, whereby the actuator piston is accelerated from the wall to produce output thrust.

6. An actuator comprising housing means defining first and second pressure chambers, means defining a wall having a pressure retaining portion within the housing means, an actuator piston adapted for cooperation with the wall to provide a pressure seal therebetween about said portion of the wall, means for applying a set pressure to the piston to exert a set force urging the piston toward the wall to effect said pressure seal, said pressure seal separating a first piston area outside the pressure seal and a second piston area within the pressure seal, and means for applying an actuating pressure to said first piston area to exert a second force opposing the set force, and means for applying a triggering force to the piston to cooperate with said second force in overbalancing the set force to eliminate the pressure seal and apply the actuating pressure to said second piston area, whereby the actuator piston is rapidly accelerated from the wall to produce output thrust.

7. An actuator comprising means defining first and second pressure chambers, means defining a wall having a pressure retaining portion, an actuator piston slidable in said first chamber and confronting the wall, said actuator piston being adapted for cooperation with the wall to provide a pressure seal therebetween about said portion of the wall, means for establishing a set pressure in said first chamber to exert a set force urging the actuator piston toward the wall to effect said pressure seal, and means for establishing an actuating pressure in said second chamber to act upon an area of the actuator piston outside said pressure seal to overbalance said set force to eliminate said pressure seal and release the actuating pressure upon an increased area of the piston, whereby the actuator piston is accelerated from the wall to produce output thrust.

8. An actuator comprising housing means defining an inner first pressure chamber and a coaxial outer second pressure chamber, means defining a wall having a pressure retaining portion, an actuator piston in said first chamber and confronting the wall, said actuator piston being adapted for cooperation with the wall to provide a pressure seal therebetween about said portion of the wall, means for establishing a set pressure in the first chamber for exerting a set force urging the piston against the wall to establish said pressure seal, and means for establishing an actuating pressure in said second chamber to act upon an area of the piston outside said pressure seal to overbalance the set force and expose an increased area of the piston to the actuating pressure, whereby the piston is accelerated from said wall to produce output thrust.

9. An actuator comprising housing means defining an inner first pressure chamber and a coaxial outer second pressure chamber, means defining a wall having a pressure retaining portion, an actuator piston in said first chamber and confronting the wall, said actuator piston being adapted for cooperation with the wall to provide a pressure seal therebetween about said portion of the wall, means for establishing a set pressure in the first chamber for exerting a set force urging the piston against the wall to establish said pressure seal, and means for establishing an actuating pressure in said second chamber to act upon an area of the piston outside said pressure seal to exert a second force opposing said set force, and means for applying a triggering force to the actuator piston to cooperate with said second force in overbalancing the set force to eliminate the pressure seal and expose an increased area of the piston to said pressure, whereby the piston is accelerated from said wall to produce output thrust.

10. An actuator comprising housing means defining an inner first pressure chamber and a coaxial outer second pressure chamber, means defining a wall, an actuator piston in said first chamber and confronting the wall, said actuator piston being adapted for cooperation with the wall to provide a pressure seal therebetween about a portion of the wall, means for establishing a set pressure in the first chamber for exerting a set force urging the piston against the wall to establish said pressure seal, and means for establishing an actuating pressure in said second chamber to act upon an area of the piston outside said pressure seal to exert a second force opposing said set force, and means for applying a triggering force to the actuator piston to cooperate with said second force in overbalancing the set force to eliminate the pressure seal and expose an increased area of the piston to said pressure, said actuator piston having a cavity defined by an inner piston surface and confronting the wall, and a contoured metering member extending from the wall and cooperating with said inner piston surface to regulate flow to the moving piston to produce a predetermined thrust-time output pattern.

11. An actuator comprising housing means defining an inner first pressure chamber and a coaxial outer second pressure chamber, means defining a wall having a pressure retaining portion, an actuator piston positioned in said first chamber and confronting the wall, resilient sealing means disposed between the piston and the wall for effecting a pressure seal therebetween about said portion of the wall, means for establishing a set pressure in the first chamber to exert a set force urging the piston against the wall to establish said pressure seal, and means for establishing an actuating pressure in said second chamber to act upon an area of the piston outside said pressure seal to overbalance the set force and expose an increased area of the piston to the actuating pressure, thereby accelerating the actuator piston from said wall to produce output thrust.

12. An actuator comprising housing means defining an inner first pressure chamber and a coaxial outer second pressure chamber within the housing, means defining a wall having a pressure retaining portion at an end of the first pressure chamber, an actuator piston slidable in said first chamber and confronting the wall, a resilient sealing element positioned between the actuator piston and the wall for effecting a pressure seal therebetween about said portion of the wall, means for establishing a set pressure in the first chamber to exert a set force urging the actuator piston toward the wall to establish said pressure seal, said pressure seal separating a first piston area outside the pressure seal and a second piston area within the pressure seal, and means for establishing an actuating pressure in said second chamber to act upon said first piston area outside the seal to overbalance the set force and expose said second piston area to the actuating pressure, thereby accelerating the actuator piston from the wall to produce useful output thrust.

13. An actuator comprising housing means defining an inner first pressure chamber and a coaxial outer second pressure chamber within the housing, means defining a wall having a pressure retaining portion at an end of the first pressure chamber, an actuator piston slidable in said first chamber and confronting the wall, a resilient sealing element positioned between the actuator piston and the wall for effecting a pressure seal therebetween about said portion of the wall, means for establishing a set pressure in the first chamber to exert a set force urging the actuator piston toward the wall to establish said pressure seal, said pressure seal separating a first piston area outside the pressure seal and a second piston area within the pressure seal, and means for establishing an actuating pressure in said second chamber to act upon said first piston area outside the seal to exert a second force opposing said set force, and means for applying a triggering force to the actuator piston to cooperate with said second force in overbalancing the set force to eliminate the pressure seal and expose an increased area of the piston to said pressure, thereby accelerating the actuator piston from the wall to produce useful output thrust.

14. An actuator comprising housing means defining an inner first pressure chamber and a coaxial outer second pressure chamber within the housing, means defining a wall at an end of the first pressure chamber, an actuator piston slidable in said first chamber and confronting the wall, a resilient sealing element positioned between the actuator piston and the wall for effecting a pressure seal therebetween about a portion of the wall, means for establishing a set pressure in the first chamber to exert a set force urging the actuator piston toward the wall to establish said pressure seal, said pressure seal separating a first piston area outside the pressure seal and a second piston area within the pressure seal, and means for establishing an actuating pressure in said second chamber to act upon said first piston area outside the seal to exert a second force opposing said set force, and means for applying a triggering force to the actuator piston to cooperate with said second force in overbalancing the set force to eliminate the pressure seal and expose an increased area of the piston to said pressure, said actuator piston having a cavity defined by an inner piston surface and confronting the wall, and a contoured metering member extending from the wall and cooperating with said inner piston surface to regulate flow to the moving piston to produce a predetermined thrust-time output pattern.

15. An actuator comprising housing means defining an inner first pressure chamber and a coaxial outer second pressure chamber within the housing, means defining a wall having a pressure retaining portion at an end of the first pressure chamber, an actuator piston slidable in said first chamber and confronting the wall, a resilient sealing element positioned between the actuator piston and the wall for effecting a pressure seal therebetween about said portion of the wall, means for establishing a set pressure in the first chamber to exert a set force urging the actuator piston toward the wall to establish said pressure seal, said pressure seal separating a first piston area outside the pressure seal and a second piston area within the pressure seal, and means for establishing an actuating pressure in said second chamber to act upon said first piston area outside the seal to exert a second force opposing said set force, and means for introducing a triggering pressure to said second piston area to cooperate with said second force in overbalancing the set force to eliminate the pressure seal and expose an increased area of the piston to said pressure, whereby the actuator piston is accelerated from the wall to produce useful output thrust.

16. An actuator comprising housing means defining an inner first pressure chamber and a coaxial outer second pressure chamber within the housing, means defining a wall having a pressure retaining portion at an end of the first pressure chamber, a sealing rim on the wall about said portion thereof, an actuator piston slidable in said first chamber and confronting the wall, a resilient sealing element on the piston and adapted to cooperate with said sealing rim to provide a pressure seal between the piston and the wall about said wall portion, means for establishing a set pressure in the first chamber to exert a set force urging the actuator piston toward the wall to establish said pressure seal, said pressure seal separating a first said piston area outside the pressure seal and a second piston area within the pressure seal, and means for establishing an actuating pressure in said second chamber to act upon said first piston area outside the seal to overbalance the set force and expose said second piston area to the actuating pressure, thereby accelerating the actuator piston from the wall to produce useful output thrust.

17. An actuator comprising means defining a pressure-retaining wall, an actuator piston adapted for cooperation with the wall to provide a pressure seal therebetween about a portion of the wall, means for exerting a set force urging the piston toward the wall to effect said pressure seal, means for applying pressure to the piston to overbalance the set force to eliminate said pressure seal and apply the pressure on an increased area of the piston, thereby impelling the piston from the wall, said piston having an opening confronting the wall, and a contoured metering member extending from the wall into the piston opening for cooperation with the piston to regulate flow to the moving piston to produce a predetermined thrust-time output pattern.

18. An actuator comprising means defining a wall having a pressure retaining portion, an actuator piston slidable in a cylinder and confronting the wall, said piston being adapted for cooperation with the wall to provide a pressure seal about said portion of the wall, means for exerting a set force urging the piston toward the wall to effect said pressure seal, said cylinder having openings therein adjacent to the piston and extending axially beyond the end of the piston when said pressure seal is effected, whereby upon the elimination of the pressure seal pressure is instantly applied to an end area of the piston through said openings, and means for applying force to the piston to overbalance said set force to eliminate the pressure seal and expose said piston end area to said pressure, whereby the actuator piston is impelled from the wall to produce output thrust.

References Cited in the file of this patent

UNITED STATES PATENTS 2,925,803     Ottestad _____ Feb. 23, 1960
2,949,096     Ottestad et al. _____ Aug. 16, 1960